United States Patent
Trangsrud

(10) Patent No.: US 7,581,655 B1
(45) Date of Patent: Sep. 1, 2009

(54) PULLBOX ASSEMBLY

(76) Inventor: Julian P. Trangsrud, 300 Cherry St., Northfield, MN (US) 55057

(*) Notice: Subject to any disclaimer, the term of this patent is extended or adjusted under 35 U.S.C. 154(b) by 26 days.

(21) Appl. No.: 11/747,532

(22) Filed: May 11, 2007

Related U.S. Application Data

(63) Continuation-in-part of application No. 11/186,270, filed on Jul. 21, 2005.

(51) Int. Cl.
B65D 88/76 (2006.01)
H02G 3/08 (2006.01)

(52) U.S. Cl. .......... 220/4.03; 220/4.02; 220/484; 220/622; 220/692; 174/50

(58) Field of Classification Search .......... 220/4.03, 220/4.02, 3.8, 3.3, 484, 601, 608, 622, 692; 174/50

See application file for complete search history.

(56) References Cited

U.S. PATENT DOCUMENTS

| | | | | |
|---|---|---|---|---|
| 3,190,039 A * | 6/1965 | Carlson | ............ | 47/41.1 |
| 3,541,727 A * | 11/1970 | Carlson | ............ | 47/41.1 |
| 3,972,440 A * | 8/1976 | Warren | ............ | 220/484 |
| 4,153,176 A * | 5/1979 | Carson | ............ | 220/484 |
| 4,163,503 A * | 8/1979 | McKinnon | ............ | 220/484 |
| 4,874,105 A * | 10/1989 | Tetreault | ............ | 220/484 |
| 5,353,206 A * | 10/1994 | Fejes | ............ | 362/154 |
| 5,503,088 A * | 4/1996 | Hayman | ............ | 109/50 |
| 5,603,401 A * | 2/1997 | Brunner | ............ | 206/204 |
| 5,611,616 A * | 3/1997 | Chandler | ............ | 362/154 |
| 5,722,204 A * | 3/1998 | Stieb et al. | ............ | 52/20 |
| 5,735,430 A * | 4/1998 | Gorman | ............ | 220/484 |
| 5,747,687 A * | 5/1998 | Edwards et al. | ............ | 73/277 |
| 5,819,975 A * | 10/1998 | Pendleton et al. | ............ | 220/484 |
| 5,975,323 A * | 11/1999 | Turan | ............ | 220/3.7 |
| 6,164,134 A * | 12/2000 | Cargille | ............ | 73/504.02 |
| 6,321,928 B1 * | 11/2001 | Goldenstein et al. | ............ | 220/484 |
| 6,708,834 B2 * | 3/2004 | Hagerman, III | ............ | 220/4.02 |
| 6,881,899 B1 * | 4/2005 | Trangsrud | ............ | 174/50 |
| 7,193,160 B2 * | 3/2007 | Dinh | ............ | 174/483 |
| 7,361,834 B1 * | 4/2008 | Trangsrud et al. | ............ | 174/66 |
| 2003/0066832 A1 * | 4/2003 | Kipka et al. | ............ | 220/4.02 |

* cited by examiner

Primary Examiner—Anthony D Stashick
Assistant Examiner—Niki M Eloshway
(74) Attorney, Agent, or Firm—C. G. Mersereau; Nikolai & Mersereau, P.A.

(57) ABSTRACT

A pullbox assembly for use in wiring having an upwardly tapered cylindrical main body having a larger diameter base than top for preventing upward movement of the pullbox when installed in the ground due to frost or soil conditions. The taper of the pullbox allows fill to be placed all around the pullbox easily. The pullbox may have a base with apertures, or a ledge at the base's rim, for allowing fill to exit when lifting the pullbox to a desired height in a hole. The fill exiting the base of the pullbox forms a smooth, even base for the pullbox when the pullbox is rotated in the hole. The apertures in the base also act as drainholes for letting water in and out and preventing groundwater from lifting the pullbox after installation. A strong lightweight plastic cover can be used to cover the pullbox for street traffic use.

10 Claims, 5 Drawing Sheets

PULLBOX ASSEMBLY

This application is a continuation-in-part of Ser. No. 11/186,270 filed Jul. 21, 2005.

BACKGROUND OF THE INVENTION

1. Field of the Invention

This invention relates to belowground pullboxes for semaphores and other electrical connections.

2. Description of the Related Art

Some pullboxes are cylindrical and tapered such that the base is smaller than the top. However this may be problematic in some soil conditions as the pullbox may be pushed up and out of the ground due to the soil conditions or frost.

It is difficult to set pullboxes at the desired height in the ground during installation since the box has to be lifted out of the ground and more fill added or subtracted until the proper depth of the pullbox is reached.

The covers on the pullboxes frequently are iron, which is very heavy, making it hard to work with and costly.

SUMMARY OF THE INVENTION

The pullbox has a generally cylindrical shape with tapered walls wherein the diameter at the base is larger than the diameter at the top. When placed in a hole, the fill material fills in over the side walls without leaving any gaps and the pullbox will be difficult to pull up out of the ground due to the tapered side walls having to move the fill material to raise the pullbox, thus preventing soil conditions and frost from raising the pullbox after it is placed in the ground.

The pullbox has a base with a concave portion and apertures for allowing fill material such as sand to flow through the base to adjust the height of the pullbox in a hole by adding a layer of sand or fill to the pullbox and lifting it, allowing the fill to exit the base of the pullbox and set the pullbox on the fill now under the pullbox.

The cover for the pullbox can be made of a plastic, fiberglass or other strong lightweight material to cover the pullbox.

OBJECTS OF THE INVENTION

It is an object of the invention to produce pullboxes which are easy to install to the right depth in the ground.

It is an object of the invention to produce pullboxes which will not lift up out of the ground due to soil conditions or frost forcing the pullboxes upward.

It is an object of the invention to provide a strong, lightweight cover for the pullbox.

It is an object of the invention to provide a ridge on the base of the pullbox for ease of setting the height of the pullbox in the ground and for providing an open base for water to enter or leave the pullbox.

It is an object of the invention to provide a ridge on the base of the pullbox for depth stability.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
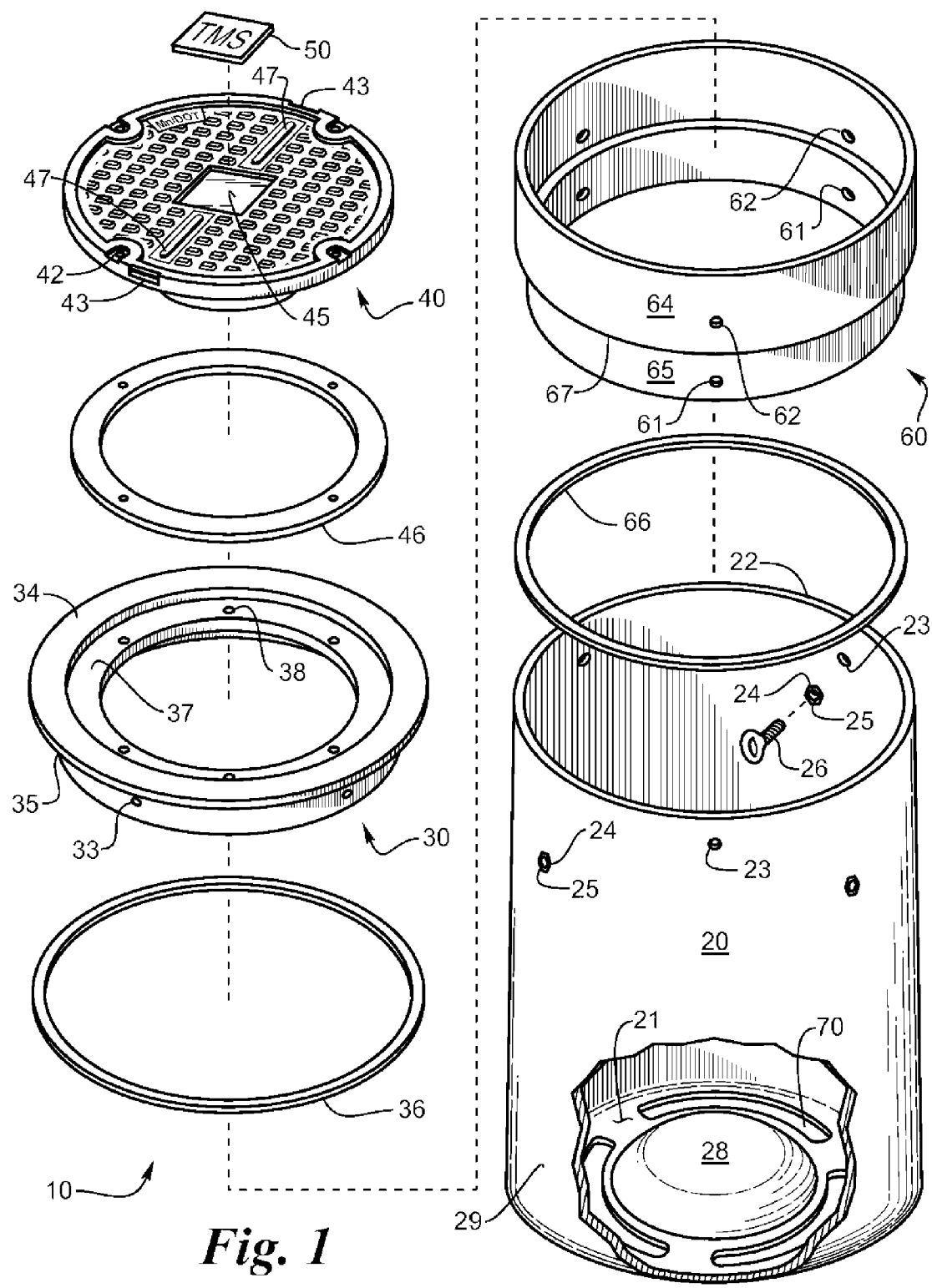
FIG. 1 is a perspective exploded view of the pullbox assembly with an extension section.

The pullbox assembly 10 has a tapered cylindrical body 20, a casting frame 30, a cover 40 and optionally at least one extension 60. The casting frame 30 is bolted to the cylindrical body 20 and the cover 40 is optionally bolted to the casting frame 30 so the entire pullbox assembly 10 is integrally connected such that if one portion of the pullbox assembly 10 moves, the entire pullbox assembly 10 moves. If optional extension 60 is used, the extension 60 is optionally bolted to the pullbox assembly 10.

The pullbox assembly 10 as shown in FIG. 1 has a base 21 with apertures 70 which will allow sand, gravel or other fill material to be placed in the cylindrical body 20 when in a hole such that when the cylindrical body 20 is lifted up, the apertures 70 allow some of the fill material to exit the base 21 so it is under the cylindrical body 20. The cylindrical body may thus be adjusted to the desired height in a hole without having to remove the cylindrical body 20 and add fill material to the hole. If, when lifted, the cylindrical body 20 is rotated, the fill material will be spread under the cylindrical body 20 for a smooth, level fill.

The cylindrical body 20 is tapered with a larger diameter at the base. The taper allows for fill added after the cylindrical body 20 is placed in a hole to be added all around the cylindrical body 20 from the base to the top. The taper also makes it harder for frost or soil conditions to lift the cylindrical body 20 out of the hole as the fill has to be displaced to lift the cylindrical body 20.

At an installation site a pullbox is used to protect wiring connections and provide access to those connections for initial installation, and later for maintenance or alterations. Typically, wiring for semaphores, street lights, and other uses are connected inside of a protective enclosure buried in the ground with the wires to stop signals, street lights or other devices buried in the ground meeting in the pullbox assembly 10. Holes are drilled in the side of cylindrical body 20 to let wires inside of the pullbox assembly 10. The wires are then connected to each other or to equipment in the pullbox assembly 10. For waterproof or moisture proof pullbox assemblies 10, the wires and the cylindrical body 20 have a compound sealant applied to prevent leakage. In the waterproof or moisture proof embodiment shown in FIG. 1, gaskets 46 are used between the cover 40 and the casting frame 30, gasket 36 is used between the casting frame 30 and the cylindrical body 20 or optionally extension 60. Further, if the optional extension 60 is used, gasket 66 is used between extension 60 and cylindrical box 20.

The cylindrical body 20 is molded with a solid base 21 for supporting the cylindrical body 20 on a flat surface at the bottom of a hole. The solid base 21 provides a substantially flat base to rest the pullbox assembly on so that it does not sink into the hole, or tilt to one side due to soft ground conditions. The sidewalls 29 of the cylindrical body 20 are tapered outward from the base 21 with a larger diameter than the rim 22. The base 21 has a concave center portion 28 extending into the cylindrical body 20. The center portion 28 serves to strengthen the base 21. The apertures 70 in the base 21 allow for fill added to the cylindrical body 20 to pass therethrough to adjust the height of the cylindrical body in the hole.

The apertures 70 in base 21 act as drainage holes such that groundwater can enter or leave the cylindrical body 20. If there were no drainage holes, groundwater would tend to raise the cylindrical body 20 when the water table gets high.

Figure 7:
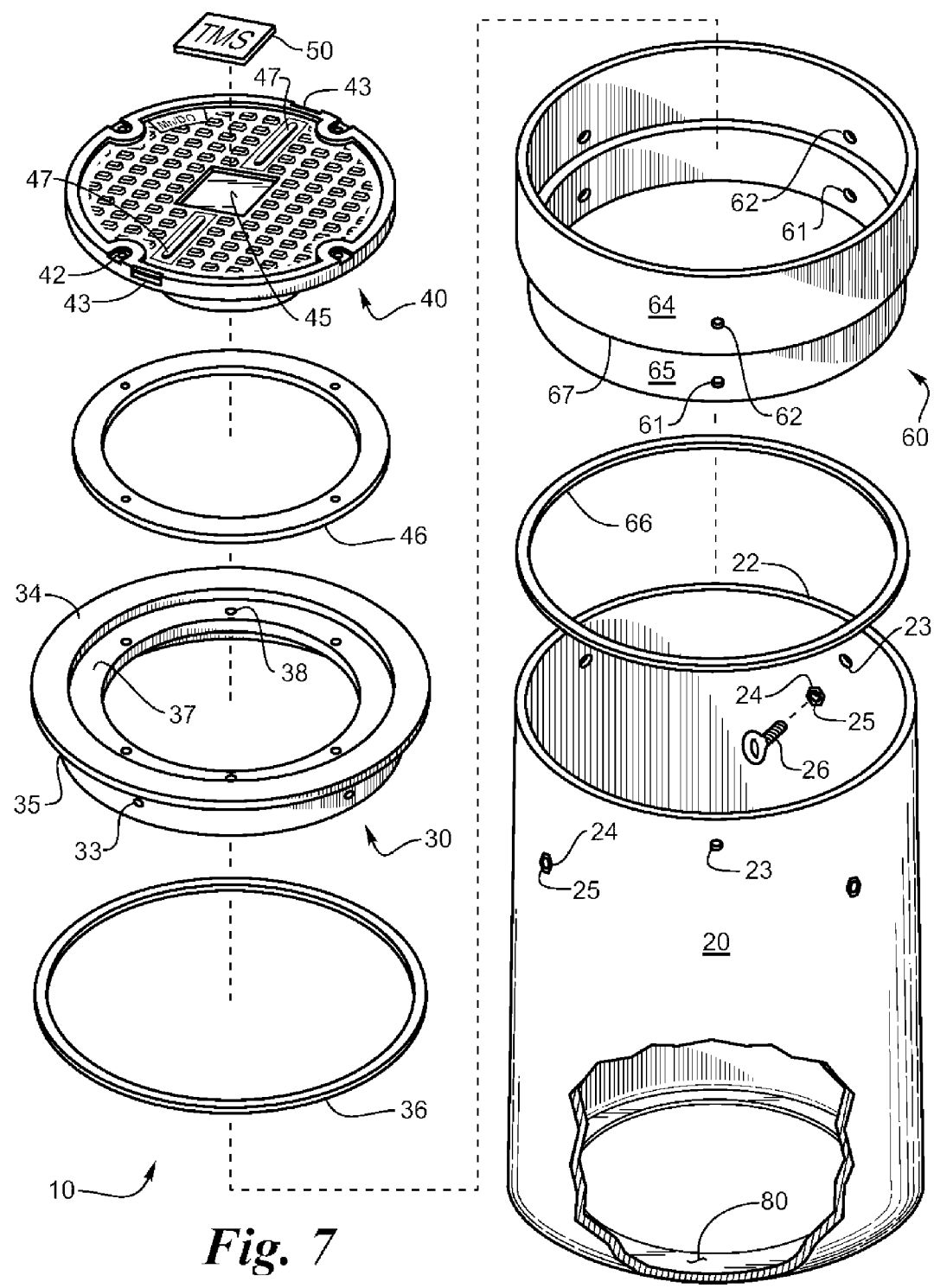
FIG. 7 is a perspective view of the pullbox assembly with a ridge at the base.

The cylindrical body 20 may have an open base with a ridge 80 on the circumference as shown in FIG. 7. The ledge 80 allows the pullbox 10 to rest on the ground so that it is stable at the base. The open area at the bottom allows water to enter and leave pullbox 10. On installation, if the excavated hole is too deep, material such as sand or gravel can be added to the hole and the pullbox 10 can placed in the hole and tapped down into place with the ledge 80 allowing the material to be displaced around it until the pullbox 10 is stably placed at the right height. If the height needs to be raised, it is easy to lift the cylindrical body 20 up since the fill material can easily escape around the ledge 80. New fill can then be added to raise the pullbox 10 and it can then be reinserted into the excavated hole and tapped down into place.

In a preferred embodiment, the cylindrical body 20 has three eyebolts 26 in the sidewall 29 of the cylindrical body 20 to facilitate lifting the cylinder body 20. Although three eyebolts are used in one preferred embodiment, any number of eyebolts 26 can be used. The placement of the eyebolts can vary. The eyebolts can be used not only for lifting the cylindrical body but also for holding the wires or cables inside of the inbox at desired heights.

The cylindrical body 20 also has a rim 22 for providing a shelf for the casting frame 30. The casting frame 30 has a flange ring portion 34 for resting on top of the rim 22 of the cylindrical body 20 and seating ring portion 35 for nesting into the cylindrical body 20 and having an outer diameter just smaller than the inner diameter of the cylindrical body 20. A bolt passing through the bolt aperture 33 in the seating ring portion 35 of the casting frame 30 and the bolt aperture 23 in the cylindrical body 20 secures the cylindrical body 20 to the casting frame 30. The casting ring may be molded from a ductile iron, cast iron or different types of plastic material. The cylindrical body 20 is preferably molded from a polyethylene or plastic material.

Figure 2:
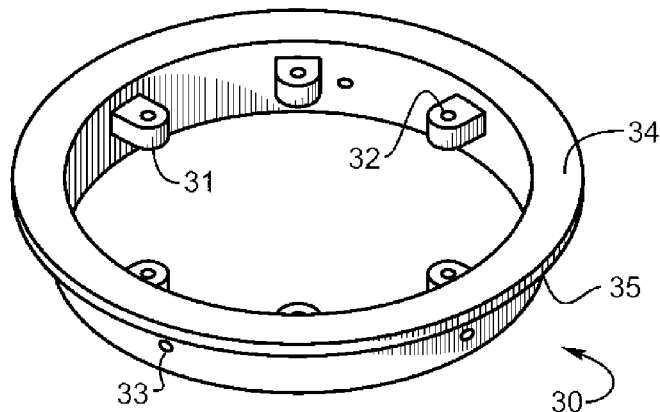
FIG. 2 is a perspective view of the pullbox casting frame.
Figure 3:
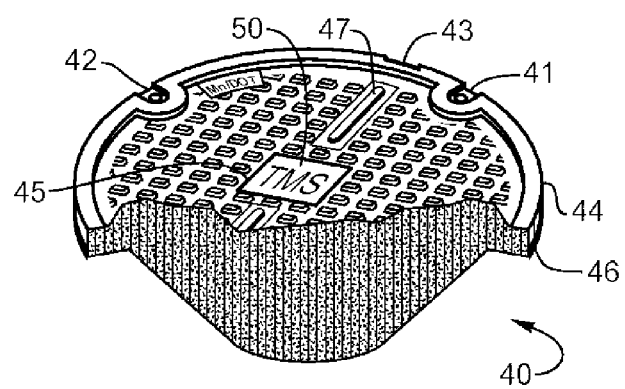
FIG. 3 is a perspective cut-away view of the cover.
Figure 5:
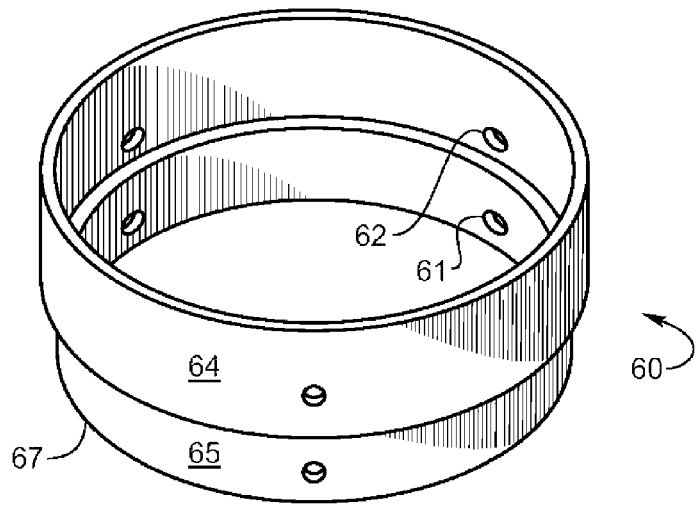
FIG. 5 is a perspective view of the extension for the pullbox assembly.
Figure 4:
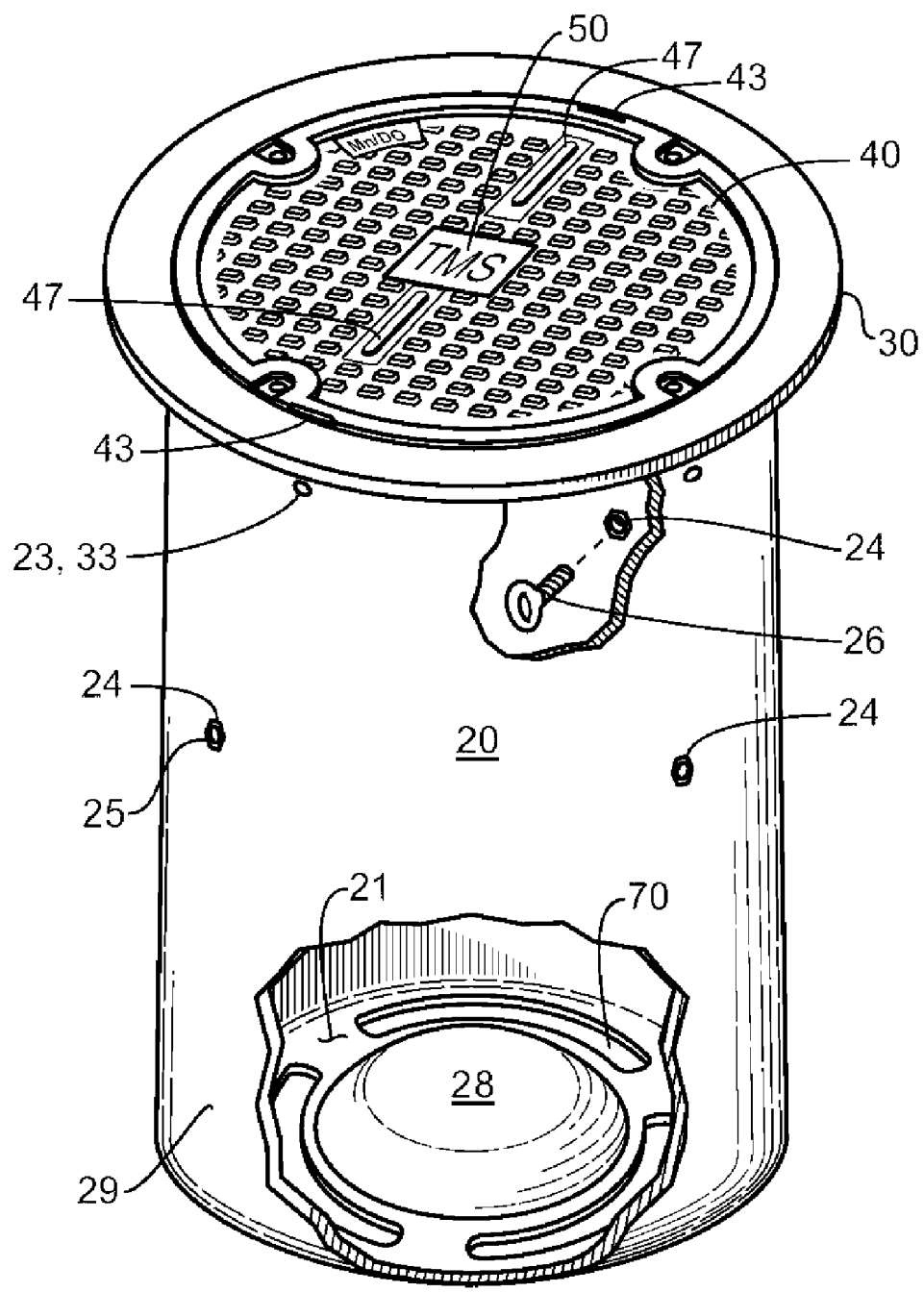
FIG. 4 is a perspective view of the pullbox assembly with apertures in the base.
Figure 6:
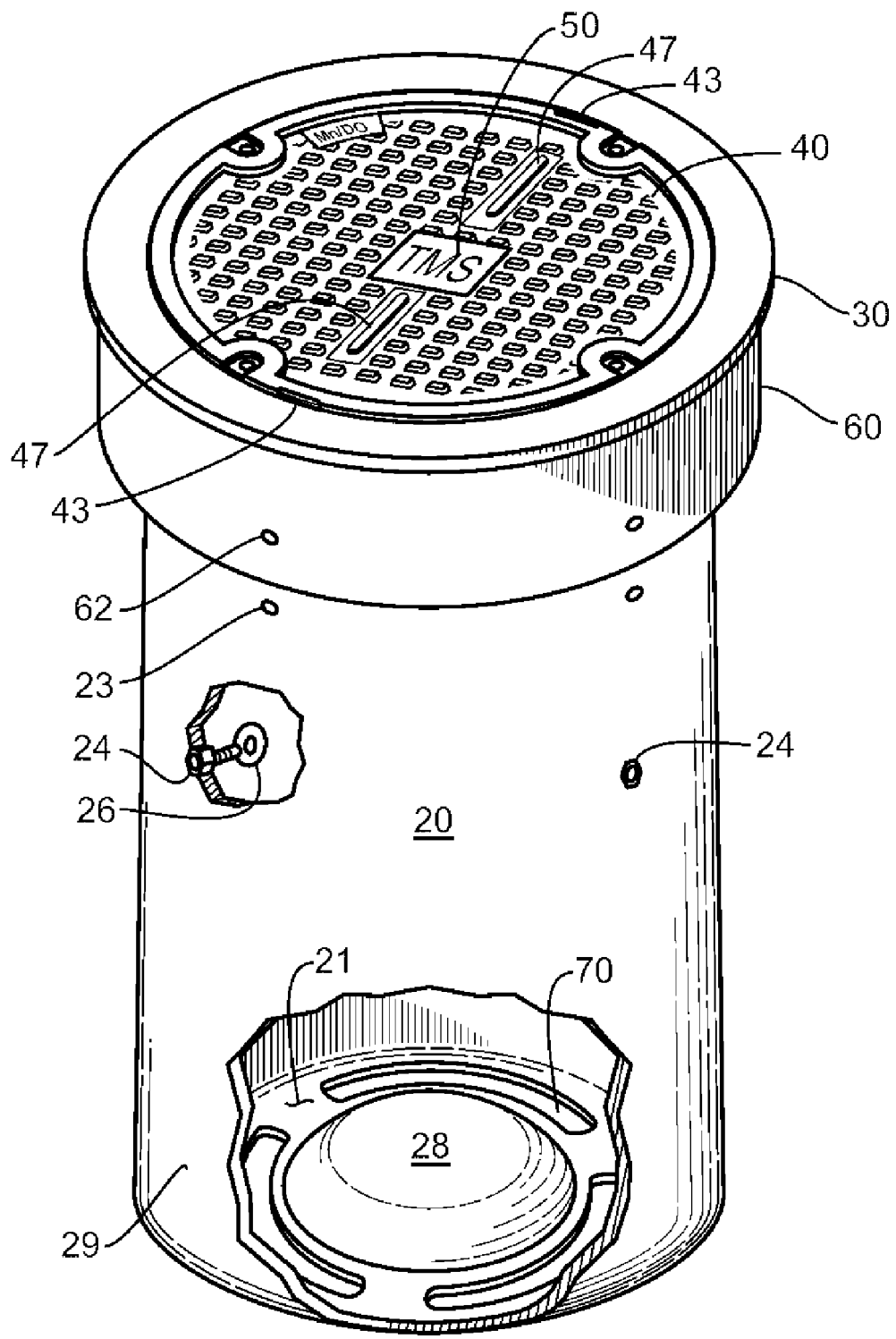
FIG. 6 is a perspective view of the pullbox assembly with an extension attached.

The casting frame 30 may have a flange 37 optionally with bolt apertures 38 as shown in the embodiment in FIG. 1 for engaging the cover 40, which has bolt apertures 42 for securing the cover 40 to the casting frame 30 with bolts. The casting frame 30 may alternatively have bolt arms 31 with bolt apertures 32, as shown in FIG. 2, for securing the cover 40 by means of bolts though bolt apertures 42. The embodiment of the casting cover 30 with flange 37 is used in conjunction with moisture and water sealing gaskets 46 providing a seal between the cover 40 and the casting cover 30. Similarly, a gasket 36 can be used for a moisture or water-sealing embodiment between the casting cover 30 and the cylindrical body 20.

The cover 40 may be made from a plastic, fiberglass or some other lightweight, easy-to-lift material. As shown, the cover 40 has a generally trapezoidal shape to have extra material for supporting large weights as would be encountered in street traffic. The cover 40 may be thicker than iron covers. The cover 40 may have a bolt recess portion 41 so that the bolts do not stick up over the cover and provide a hazard for traffic passing over the cover. The cover 40 and casting frame may have a highway department H10 rating for the loads it can carry when combined with and depending on the standard of the specifications for the pullbox to be used.

The cover 40 may have a tapered outer diameter 44 to allow for easier placement in casting frame 30.

The cover 40 may also have pry slots 43 for aid in lifting the cover 40 off of the casting frame 30. The cover 40 may also have a recessed portion 45 for insertion of a nameplate 50 to identify the equipment inside of the pullbox assembly 10. For example, the label TMS is for Traffic Maintenance Signals or it may say Lighting or Signals. Having to stock only one set of covers 40 reduced inventory costs over having separately labeled covers with the labels molded into the covers. Different nameplates 50 can be stored at low cost. The nameplates can be secured to the covers 40 in numerous ways including bolting and gluing. The cover 40 may also have two lifting handles 47 at 180 degrees from each other along the same line as the pry slots 43.

In an alternative embodiment for a pullbox assembly 10 of a different height, an extension 60 can be used to add to the height of pullbox assembly 10, making the pullbox fit into a hole which must be deeper to get down to the level of the wires buried in the ground. The extension 60 has an upper diameter ring portion 64 of a first diameter and a lower diameter ring portion 65 of a second diameter, the two diameter ring portions integral with each other and forming a ledge portion 67 at the junction. The ledge portion 67 rests on the rim 22 of the cylindrical body 20. The lower diameter portion 65 nests into the cylindrical body 20 and the upper diameter portion 64 supports casting frame 30 with the seating ring portion 35 thereof nesting therein. Bolt apertures 61 in the lower diameter portion of the extension 60 align with bolt apertures 23 in the cylindrical body 20 to optionally allow the extension 60 to be secured by bolts to the cylindrical body 20. The upper diameter ring portion 64 is secured to the casting frame 30 by bolt apertures 62 aligning with bolt apertures 23 of the cylindrical body 20. If a moisture or waterproof connection is desired, gasket 36 is installed between the casting frame 30 and the extension 60, and gasket 66 is installed between extension 60 and cylindrical body 20. In some embodiments more than one extension 60 can be used.

The applicant's U.S. Pat. No. 6,881,899, issued Apr. 19, 2005, entitled "Pullbox Assembly" is attached hereto, made a part hereof and included herein by reference.

Obviously, many modifications and variations of the present invention are possible in light of the above teachings. It is therefore to be understood that, within the scope of the appended claims, the invention may be practiced otherwise than as specifically described.

What is claimed is:

1. A pullbox comprising:
a hollow cylindrical body having a base, a tapered side wall with a rim at the top, and a bottom wall, the cylindrical body having a larger diameter at the base than at the top for an inclined upward slope of the tapered side wall,
the top of the hollow cylindrical body being open ended,
a plurality of bolt apertures through the hollow cylindrical body near the rim and wherein the side wall has at least one threaded insert imbedded therein,
the bottom wall of the hollow cylindrical body having at least one aperture of sufficient size and shape to enable fill to pass therethrough to a location directly beneath the pullbox, such that as a pullbox containing fill is pulled upward to adjust its position in a hole fill passes from inside the pullbox to under the pullbox thereby adjusting the support level of the pullbox,
a casting frame having a hollow cylindrical body, a side wall with an inner diameter and two outer diameters, the first outer diameter forming a neck for insertion into the inner diameter of the pullbox cylindrical body, and a second outer diameter forming a base for resting on the rim of the pullbox cylindrical body, the diameter of the second outer diameter being larger then the first outer diameter, a plurality of bolt apertures through the casting frame hollow cylindrical body side wall in the neck which align with the bolt apertures in the side wall of the pullbox cylindrical body such that bolts passing therethrough secure the casting frame to the pullbox.

2. A pullbox as in claim 1 having:

a plurality of arms extending inward from the inside diameter of the casting frame, each arm having a threaded bolt aperture.

3. A pullbox as in claim 2 having:

a cover in the shape of a disk having a plurality of bolt apertures and a diameter approximating the inside diameter of the casting frame such that the cover rests on the arms in the casting frame and the bolt holes align, allowing the cover to be secured to the casting frame.

4. A pullbox as in claim 3 wherein:

the plurality of arms extending from the inside diameter of the casting frame are continuous and form a flange around the inside of the casting frame, the flange having a plurality of threaded bolt apertures.

5. A pullbox as in claim 1 wherein:

a gasket placed at the rim of the pullbox cylindrical body provides a watertight seal with the casting frame.

6. A pullbox as in claim 1 wherein:

a gasket placed at the flange of the casting frame body provides a watertight seal with the cover.

7. A pullbox as in claim 1 wherein:

the pullbox hollow cylindrical body base has a concave center portion for strengthening the base.

8. A pullbox as in claim 1 including:

an extension having a hollow cylindrical body with a side wall, the cylindrical body having a neck portion with a first outer diameter and a first inner diameter and a casting frame engaging portion having a second outer diameter and a second inner diameter, a plurality of bolt apertures through the side wall in the neck portion and a plurality of bolt apertures through the side wall in the casting frame engaging portion such that the extension neck fits inside of the pullbox cylindrical body and the bolt apertures line up for securing the pullbox cylindrical body to the extension, and the casting frame fits into the casting frame extension portion and the bolt apertures line up for securing the casting frame to the extension.

9. A pullbox as in claim 8 wherein:

a gasket between the extension and the casting frame and a gasket between the extension and the pullbox cylindrical body provide a waterproof pullbox.

10. A pullbox as in claim 1 including:

an extension having a hollow cylindrical body with a side wall, the cylindrical body having a neck portion with a first outer diameter and a first inner diameter and a casting frame engaging portion having a second outer diameter and a second inner diameter, a plurality of bolt apertures through the side wall in the neck portion and a plurality of bolt apertures through the side wall in the casting frame engaging portion such that the extension neck fits inside of the pullbox cylindrical body and the bolt apertures line up for securing the pullbox cylindrical body to the extension, and the casting frame fits into the casting frame extension portion and the bolt apertures line up for securing the casting frame to the extension.

* * * * *